United States Patent
Zhang et al.

(10) Patent No.: US 9,282,039 B2
(45) Date of Patent: Mar. 8, 2016

(54) ADDRESS RESOLUTION METHOD, APPARATUS, AND SYSTEM

(71) Applicant: Huawei Technologies Co., Ltd., Shenzhen (CN)

(72) Inventors: Zuofu Zhang, Nanjing (CN); Feng Dong, Nanjing (CN); Hao Sun, Shenzhen (CN); Yanjun Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 13/951,118

(22) Filed: Jul. 25, 2013

(65) Prior Publication Data
US 2013/0315246 A1    Nov. 28, 2013

Related U.S. Application Data

(63) Continuation of application No. PCT/CN2011/073028, filed on Apr. 19, 2011.

(51) Int. Cl.
| | | |
|---|---|---|
| *H04L 29/12* | (2006.01) | |
| *H04L 12/741* | (2013.01) | |
| *H04L 12/54* | (2013.01) | |
| *H04L 12/721* | (2013.01) | |

(52) U.S. Cl.
CPC .............. *H04L 45/745* (2013.01); *H04L 12/56* (2013.01); *H04L 45/66* (2013.01); *H04L 61/103* (2013.01)

(58) Field of Classification Search
None
See application file for complete search history.

(56) References Cited

U.S. PATENT DOCUMENTS

| | | | |
|---|---|---|---|
| 2005/0286518 A1 | 12/2005 | Park et al. | |
| 2010/0306408 A1 | 12/2010 | Greenberg et al. | |
| 2011/0317703 A1* | 12/2011 | Dunbar ................. | H04L 12/462 370/392 |
| 2012/0014386 A1* | 1/2012 | Xiong ............... | H04L 29/12028 370/392 |

FOREIGN PATENT DOCUMENTS

| | | |
|---|---|---|
| CN | 1735067 A | 2/2006 |
| CN | 101707617 A | 5/2010 |
| CN | 101820435 A | 9/2010 |

OTHER PUBLICATIONS

Varis et al., "Minimizing ARP Broadcasting in TRILL"; Nov. 30-Dec. 4, 2009; 2009 IEEE Globecom Workshops; pp. 1-6.*
IEEE, "Virtual Bridged Local Area Networks —Amendment <>: Shortest Path Bridging" IEEE P802.1aq/D3,6—Draft Amendment to IEEE Std 802.1Q-2005, Feb. 10, 2011, 271 pages.

* cited by examiner

*Primary Examiner* — Gregory Sefcheck
*Assistant Examiner* — Jenkey Van
(74) *Attorney, Agent, or Firm* — Brinks Gilson & Lione

(57) ABSTRACT

An address resolution method uniformly processing ARP broadcast packets by an address server to avoid broadcasting in the network, so that the occupied bandwidth is reduced. The method also includes storing by a network device and terminal address correspondence information of local and remote terminals in communication with one another, which reduces the size of the MAC table in the data center network, reduces the load of the network device, and improves the processing capabilities of the network device, so that it is possible to deploy a large layer-2 network to thereby solve real-time relocation problems of a virtual machine.

9 Claims, 5 Drawing Sheets

ADDRESS RESOLUTION METHOD, APPARATUS, AND SYSTEM

CROSS-REFERENCE TO RELATED APPLICATION

This application is a continuation of International Application No. PCT/CN2011/073028, filed on Apr. 19, 2011, which is hereby incorporated by reference in its entirety.

FIELD

The present application relates to the field of network communication, and in particular, to an address resolution method, apparatus, and system.

BACKGROUND

A data center network has a huge number of servers, and each server may be virtualized into multiple virtual machines (Virtual Machine, VM). In an IP (Internet Protocol, Internet protocol) network environment, each host is allocated a 32-bit IP address. The IP address is a logical address for identifying the host in the Internet range. For a packet to be transmitted on a physical network, a physical address, that is, a MAC (Media Access Control, media access control) address of destination host must be known. This requires a group of services at the network layer to convert the IP address into a corresponding physical address; in an Internet Protocol version 4, IPv4, the group of protocols is an ARP (Address Resolution Protocol, address resolution protocol). Each VM of the data center network sends an ARP packet to broadcast its address information in a layer-2 network or request address information of other hosts. Each switch automatically learns a MAC address after receiving an ARP packet sent by a VM. Thereby, the switch learns MAC address of all VMs in a subnet, and a large MAC table is formed, usually with millions of entries. As a result, the load of a network device is too high, and processing capabilities are insufficient, and therefore limiting the scale of the network.

SUMMARY

Embodiments below provide an address resolution method, apparatus, and system, which are used to solve the following problems in the prior art: ARP broadcast packets occupy too much bandwidth; the size of the MAC table in the data center network is too large; the device load is high and processing capabilities are insufficient; and the network scale is limited.

To solve the above technical problems, an embodiment provides an address resolution method, including:

receiving an address request packet from a first terminal, where the address request packet includes a device identifier of a first network device;

querying an address correspondence table according to a destination IP address in the address request packet, where the address correspondence table includes address correspondence information, where the address correspondence information includes correspondence between an IP address of a terminal, a MAC address of the terminal, and a device identifier of a network device to which the terminal is connected; and when the destination IP address is the same as an IP address in a piece of existing address correspondence information in the address correspondence table, sending the existing address correspondence information to the first network device, so that the first network device updates a MAC table, and sending a MAC address of the first terminal and the device identifier of the first network device to a network device corresponding to a device identifier in the existing address correspondence information, so that the network device corresponding to the device identifier in the existing address correspondence information updates a MAC table.

An embodiment provides an address resolution apparatus, including:

a receiving module, configured to receive an address request packet from a first terminal, where the address request packet includes a device identifier of a first network device;

a querying module, configured to query an address correspondence table according to a destination IP address in the address request packet, where the address correspondence table includes address correspondence information, where the address correspondence information includes correspondence between an IP address of a terminal, a MAC address of the terminal, and a device identifier of a network device to which the terminal is connected; and a sending module, configured to: when the destination IP address is the same as an IP address in a piece of existing address correspondence information in the address correspondence table, send the existing address correspondence information to the first network device, so that the first network device updates a MAC table, and send a MAC address of the first terminal and the device identifier of the first network device to a network device corresponding to a device identifier in the existing address correspondence information, so that the network device corresponding to the device identifier in the existing address correspondence information updates a MAC table.

An embodiment provides an address resolution system, including a first terminal, a first network device, and an address resolution server, where:

the address resolution server is configured to: receive an address request packet from the first terminal, where the address request packet includes a device identifier of the first network device; query an address correspondence table according to a destination IP address in the address request packet, where the address correspondence table includes address correspondence information, where the address correspondence information includes IP addresses of terminals, MAC addresses of the terminals, and device identifiers of network devices to which the terminals are connected; and when the destination IP address is the same as an IP address in a piece of existing address correspondence information in the address correspondence table, send the existing address correspondence information to the first network device, so that the first network device updates a MAC table, and send a MAC address of the first terminal and the device identifier of the first network device to a network device corresponding to a device identifier in the existing address correspondence information, so that the network device corresponding to the device identifier in the existing address correspondence information updates a MAC table.

With the technical solutions provided by the embodiments, the occupation of network bandwidth and the size of the MAC table in the data center network may be reduced; the load of the network device may be reduced, and the processing capabilities of the network device may be improved, so that it is possible to deploy a very large scale network, namely, a large layer-2 network; meanwhile, the real-time relocation problem of a virtual machine can be solved.

BRIEF DESCRIPTION OF THE DRAWINGS

To illustrate the technical solutions in the embodiments or in the prior art more clearly, the following briefly introduces the accompanying drawings required for describing the embodiments or the prior art. Apparently, the accompanying drawings in the following description show merely some embodiments, and a person of ordinary skill in the art may still derive other drawings from these accompanying drawings without creative efforts.

DETAILED DESCRIPTION OF THE EMBODIMENTS

Figure 1:
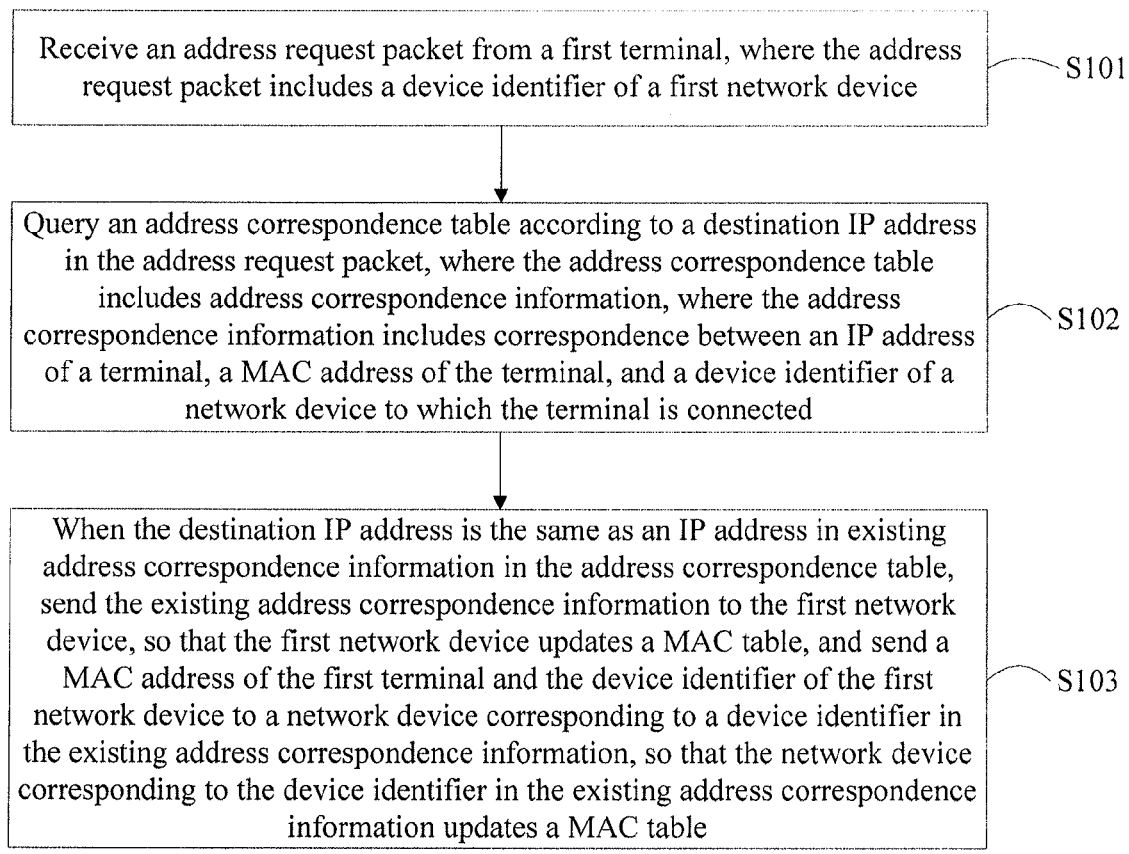
FIG. 1 is a flowchart of an address resolution method according to an embodiment.

The following clearly describes the technical solutions of the embodiments with reference to the accompanying drawings in the embodiments. Apparently, the described embodiments are merely a part rather than all of the embodiments. All other embodiments obtained by a person of ordinary skill in the art based on the embodiments without creative efforts shall fall within the protection scope.

Embodiments provide an address resolution method, including: receiving an address request packet from a first terminal, where the address request packet includes a device identifier of the first network device; querying an address correspondence table according to a destination IP address in the address request packet, where the address correspondence table includes address correspondence information, where an address correspondence information includes correspondence between an IP address of a terminal, a MAC addresses of the terminal, and a device identifier of a network device to which the terminal is connected; and when the destination IP address is the same as an IP address of an existing address correspondence information in the address correspondence table, sending the existing address correspondence information to the first network device, so that the first network device updates a MAC table, and sending a MAC address of the first terminal and the device identifier of the first network device to a network device corresponding to a device identifier in the existing address correspondence information, so that the network device corresponding to the device identifier in the existing address correspondence information updates a MAC table. With the technical solutions provided by the embodiments, the occupation of network bandwidth and the size of the MAC table in the data center network may be reduced; the load of the network device may be reduced, and the processing capabilities of the network device may be improved, so that it is possible to deploy a very large scale network, that is, a large layer-2 network; meanwhile, the real-time relocation problem of a virtual machine can be solved.

To make the objectives, features and advantages of the embodiments more comprehensible, the following further describes the embodiments in detail with reference to the accompanying drawings and specific embodiments.

Transparent interconnection of lots of links (Transparent Interconnection of Lots of Links, TRILL) is a protocol applied to a routing bridge device (Routing Bridges or RBridges, RB). TRILL runs at the data link layer, applies a link state routing technology at the data link layer, and does not interfere with the work of an upper-layer router. The RB runs an intermediate system to intermediate system (Intermediate system to intermediate system, IS-IS) protocol, and broadcasts the connection information to all RBs. Therefore, each RB may know all other RBs and the connection relationship thereof.

The following shows the packet header of a TRILL packet:

```
+-+-+-+-+-+-+-+-+-+-+-+-+-+-+-+-+-+-+-+-+
| V | R | M | Op-Length | Hop Count |
+-+-+-+-+-+-+-+-+-+-+-+-+-+-+-+-+-+-+-+-+
| Egress RBridge Nickname | Ingress RBridge Nickname |
+-+-+-+-+-+-+-+-+-+-+-+-+-+-+-+-+-+-+-+-+
| Options. . .
+-+-+-+-+-+-+-+-+-+-+-+-
```

When a terminal sends a packet, the routing bridge device RB that first receives the packet is an ingress RB, responsible for TRILL encapsulation. The ingress RB finds a last RB on a forwarding path according to a destination MAC address, and the last RB is referred to as an egress RB. The ingress RB uses the nickname of the egress RB as an egress routing bridge nickname (Egress Rbridge Nickname), and uses its own nickname as an ingress routing bridge nickname (Ingress RBridge Nickname) and places them in the TRILL header. A nickname (Nicknames) is a dynamically designated 16-bit number, and a protocol for obtaining a dynamic nickname runs between all RBs. An intermediate RB (not the ingress RB or the egress RB) decides a layer-2 address of a next-hop RB according to the egress RB after receiving the packet, uses the layer-2 address of the next-hop RB as the destination address of the outer layer-2 packet header, and uses its own layer-2 address as the source address of the outer layer-2 packet header. Though the outer layer-2 packet header changes each hop, the content of the original packet does not change.

Shortest path bridging (Shortest Path Bridging, SPB) provides functions similar to TRILL, uses an IS-IS based link state routing technology to spread and advertise the topology and the membership of the logical network, and provides a logical Ethernet on the conventional Ethernet architecture. SPB applies a MAC-in-MAC encapsulation method to encapsulate a user Ethernet frame into a carrier Ethernet frame. An edge bridge is an interface between a user network and a carrier network, and is similar to an RB device in TRILL. When an Ethernet packet reaches the edge bridge from a user terminal device, the edge bridge encapsulates the user Ethernet frame which has a MAC-in-MAC frame header and inserts the backbone destination MAC address of the edge bridge corresponding to the destination address into the Ethernet frame.

Embodiment 1

FIG. 1 is a flowchart of an address resolution method according to an embodiment, and the specific steps are as follows:

S101: Receive an address request packet from a first terminal, where the address request packet includes a device identifier of a first network device.

An ARP protocol includes a group of packets: a free ARP packet, an ARP request packet, an ARP reply packet, an RARP (Reverse Address Resolution Protocol, reverse address resolution protocol) request packet, and an RARP reply packet. In different scenarios, a host sends different ARP protocol packets to learn address information.

In IPv4, the address request packet includes an ARP request packet, where the sender IP address is the IP address of the first terminal that sends the packet, the sender MAC address is the MAC address of the first terminal that sends the packet, a destination IP address is the IP address of a destination terminal, and the destination MAC address is a broadcast address. In IPv6, the address request packet includes a neighbor solicitation (Neighbor Solicitation, NS) packet.

S102: Query an address correspondence table according to a destination IP address in the address request packet, where the address correspondence table includes address correspondence information, where the address correspondence information includes correspondence between an IP address of a terminal, a MAC address of the terminal, and a device identifier of a network device to which the terminal is connected.

S103: When the destination IP address is the same as an IP address in an existing address correspondence information in the address correspondence table, send the existing address correspondence information to the first network device, so that the first network device updates a MAC table, and send a MAC address of the first terminal and the device identifier of the first network device to a network device corresponding to a device identifier in the existing address correspondence information, so that the network device corresponding to the device identifier in the existing address correspondence information updates a MAC table.

The MAC table includes correspondence between a MAC address of a terminal and a device identifier of a network device to which the terminal is connected.

When the destination IP address is the same as an IP address in an existing address correspondence information in the address correspondence table, the address request packet is forwarded to a terminal corresponding to the IP address and MAC address in the existing address correspondence information.

Before the receiving of the address request packet from the first terminal, the following steps are further included: receiving an address advertisement packet from the first terminal, where the address advertisement packet includes the device identifier of the first network device; obtaining first address correspondence information according to the address advertisement packet, where the first address correspondence information includes correspondence between the IP address of the first terminal, the MAC address of the first terminal, and the device identifier of the first network device; and updating the address correspondence table according to the first address correspondence information.

In IPv4, the address advertisement packet includes a free ARP packet, an ARP reply packet, or an RARP reply packet; in IPv6, the address advertisement packet includes an unsolicited neighbor advertisement unsolicited NA (Neighbor Advertisement) packet.

Updating the address correspondence table according to the first address correspondence information specifically includes:

when the IP address in the first address correspondence information is different from an IP address in any address correspondence information in the address correspondence table, adding the first address correspondence information to the address correspondence information table; and when the IP and MAC addresses in the first address correspondence information are the same as IP and MAC addresses in an existing address correspondence information in the address correspondence table, and the device identifier in the first address correspondence information is different from a device identifier in the existing address correspondence information, using the first address correspondence information to update the existing address correspondence information, and sending the first address correspondence information to other network device, so that the other network device updates its MAC table.

The MAC table includes correspondence between a MAC address of a terminal and a device identifier of a network device to which the terminal is connected.

When the address advertisement packet or the address request packet is encapsulated through MAC-in-MAC or TRILL, the device identifier is carried in the encapsulation information of the address advertisement packet or the address request packet.

The device identifier may be a Nickname, an IS-IS identifier, a MAC address, or a device number.

Figure 2:
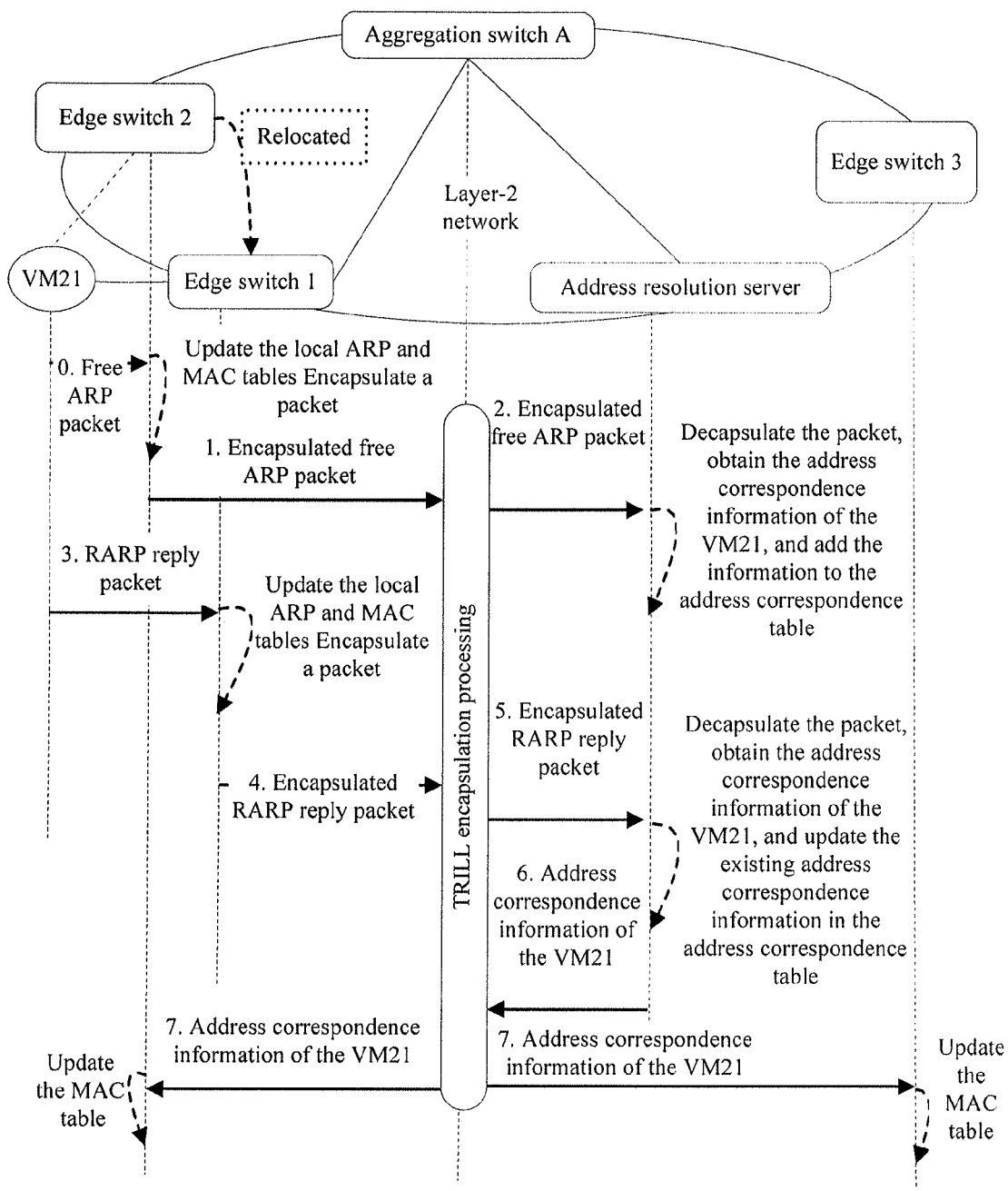
FIG. 2 is a schematic diagram of information interaction for address resolution according to an embodiment.

For example, FIG. 2 is a schematic diagram of information interaction for address resolution in IPv4 according to an embodiment.

As shown in FIG. 2, a VM21 accesses the network from an edge switch 2 to perform online registration:

First, the VM21 sends a free ARP packet, where a sender address of the free ARP packet is an IP address of the VM21, a sender MAC address of the free ARP packet is a MAC address of the VM21, a destination IP address of the free ARP packet is the IP address of the VM21, and a destination MAC address of the free ARP packet is a broadcast address.

After receiving the free ARP packet, the edge switch 2 updates a local ARP table as follows: the edge switch 2 stores correspondence between the IP address and the MAC address of the VM21 into the local ARP table, and updates a local MAC table as follows: writes, into the local MAC table, correspondence between the MAC address of the VM21 and a port identifier (for example, the port number of port1) of the port for connecting the edge switch 2 with the VM21.

Then the edge switch 2 adds a TRILL packet header to the outer layer of the free ARP packet to perform TRILL encapsulation on the free ARP packet, where the Ingress RBridge Nickname is the Nickname of the edge switch 2, and the Egress RBridge Nickname is the Nickname of an address resolution server, and then forwards the free ARP packet that has undergone the TRILL encapsulation to the address resolution server.

After receiving the free ARP packet that has undergone the TRILL encapsulation, the address resolution server decapsulates the free ARP packet that has undergone the TRILL encapsulation, and obtains address correspondence information of the VM21, including: the IP address of the VM21, the MAC address of the VM21, and the Nickname of the edge switch 2.

Then the address resolution server queries the address correspondence table according to the IP address in the address correspondence information of the VM21; when the IP address of the VM21 is different from an IP address in any address correspondence information in the address correspondence table, the address resolution server adds the address correspondence information of the VM21 to the address correspondence table.

Assuming that the VM21 is relocated from the edge switch 2 to an edge switch 1, the VM21 sends an ARP reply packet or an RARP reply packet to update network registration, as shown in FIG. 2:

First the VM21 sends the RARP reply packet or the ARP reply packet, where both the sender IP address and destination IP address of the RARP reply packet or ARP reply packet are the IP address of the VM21 after the VM21 relocation, and both the sender MAC address and destination MAC address of the RARP reply packet or the ARP reply packet are the MAC address of the VM21 after the VM21 relocation.

After receiving the RARP reply packet or ARP reply packet, the edge switch 1 updates the local ARP table and the local MAC table; then the edge switch 1 adds a TRILL packet header to the outer layer of the RARP reply packet or ARP reply packet to perform TRILL encapsulation on the RARP reply packet or ARP reply packet, where the Ingress RBridge Nickname is the Nickname of the edge switch 1, and the Egress RBridge Nickname is the Nickname of the address resolution server, and then forwards the RARP reply packet or ARP reply packet that has undergone the TRILL encapsulation to the address resolution server.

After receiving the RARP reply packet or ARP reply packet that has undergone the TRILL encapsulation, the address resolution server performs decapsulation, and obtains the address correspondence information of the VM21, including: the IP address of the VM21, the MAC address of the VM21, and the Nickname of the edge switch 1.

Then the address resolution server queries the address correspondence table according to the address correspondence information of the VM21; when the address correspondence table includes an existing address correspondence information (the IP address of the VM21, the MAC address of the VM21, and the Nickname of the edge switch 2) in which the IP and MAC addresses are the same as the IP and MAC addresses of the VM21 but the device identifier is different from the device identifier from the VM21, the address resolution server uses the address correspondence information of the VM21 to update the existing address correspondence information.

Finally, the address resolution server sends the address correspondence information (the IP address of the VM21, the MAC address of the VM21, and the Nickname of the edge switch 1) of the VM21 to other edge switch in the layer-2 network, so that the other edge switch storing VM21 information updates its own MAC entry as follows: writes the correspondence between the MAC address of the VM21 and the Nickname of the edge switch 1 into the MAC table.

The device identifier may also be carried in the payload of the address advertisement packet or the address request packet.

Figure 3:
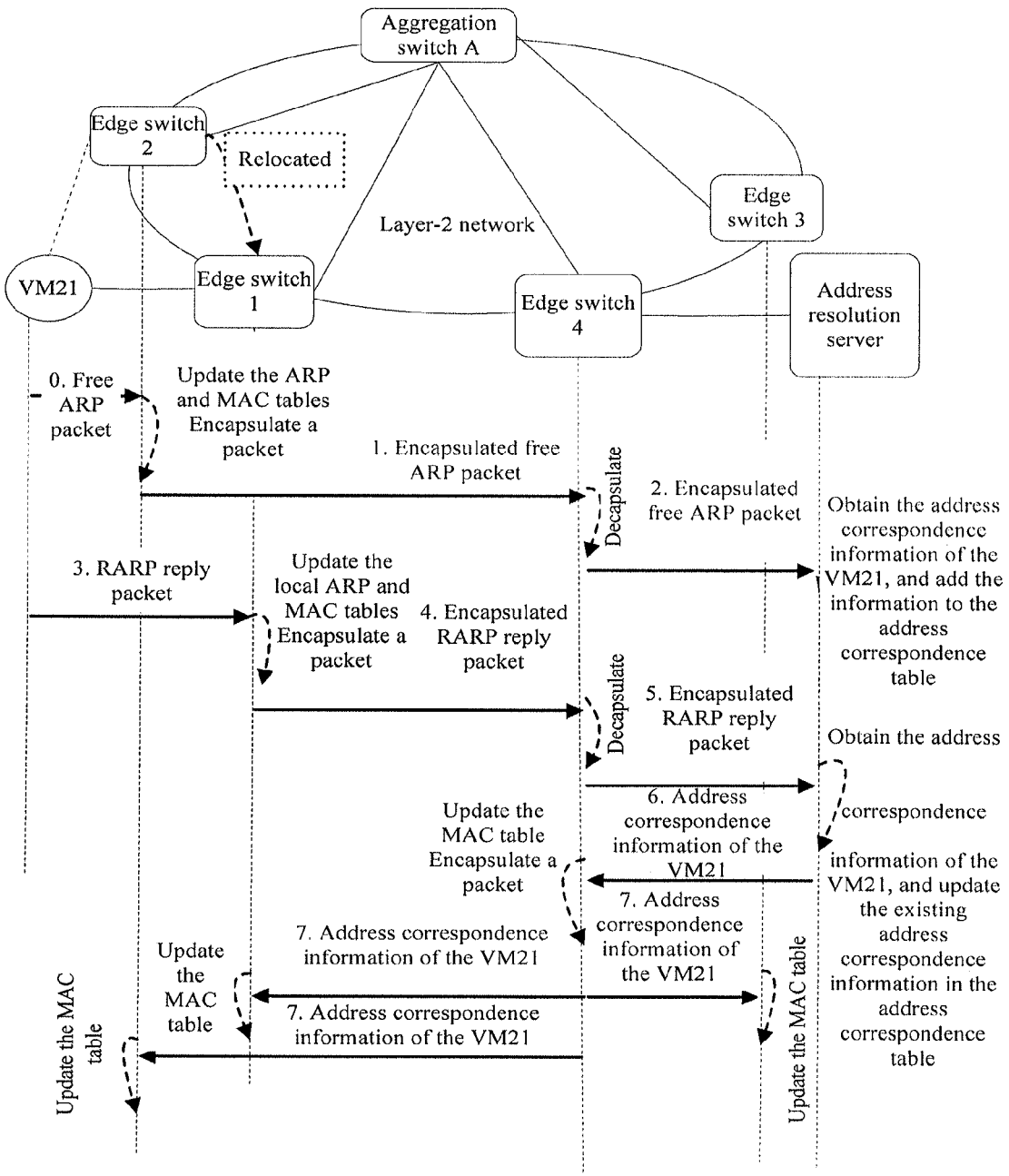
FIG. 3 is another schematic diagram of information interaction for address resolution according to an embodiment.

For example, FIG. 3 is another schematic diagram of information interaction for address resolution in IPv4 according to an embodiment.

As shown in FIG. 3, the address resolution server is connected to the network through an edge switch 4, and the VM21 accesses the network through the edge switch 2 to perform online registration.

First the VM21 sends a free ARP packet.

After receiving the free ARP packet, the edge switch 2 updates a local ARP table and a local MAC table.

Then the edge switch 2 adds its own network identifier MAC2 to the payload of the free ARP packet, performs MAC-in-MAC encapsulation on the free ARP packet, and then forwards the free ARP packet whose payload carries MAC2 that has undergone the MAC-in-MAC encapsulation to the edge switch 4 where the address resolution server is located.

After receiving the free ARP packet whose payload carries MAC2 that has undergone the MAC-in-MAC encapsulation, the edge switch 4 performs decapsulation and then forwards the packet to the address resolution server.

After receiving the free ARP packet whose payload carries MAC2, the address resolution server obtains the address correspondence information of the VM21, including: the IP address of the VM21, the MAC address of the VM21, and the network identifier MAC2 of the edge switch 2.

Then the address resolution server queries the address correspondence table according to the IP address in the address correspondence information of the VM21; when the IP address of the VM21 is different from an IP address in any address correspondence information in the address correspondence table, the address resolution server adds the address correspondence information of the VM21 to the address correspondence table.

Assuming that the VM21 is relocated from the edge switch 2 to the edge switch 1, the VM21 sends an ARP reply packet or an RARP reply packet to update network registration, as shown in FIG. 3:

First the VM21 sends the RARP reply packet or the ARP reply packet.

After receiving the RARP reply packet or ARP reply packet, the edge switch 1 updates a local ARP table and a local MAC table.

Then the edge switch 1 adds its own network identifier MAC1 to the payload of the RARP reply packet or ARP reply packet, performs MAC-in-MAC encapsulation on the RARP reply packet or ARP reply packet, and then forwards the RARP reply packet or ARP reply packet whose payload carries MAC1 that has undergone the MAC-in-MAC encapsulation to the edge switch 4 where the address resolution server is located.

After receiving the RARP reply packet or ARP reply packet whose payload carries MAC1 that has undergone the MAC-in-MAC encapsulation, the edge switch 4 performs decapsulation and then forwards the packet to the address resolution server.

After receiving the RARP reply packet or ARP reply packet whose payload carries MAC1, the address resolution server obtains the address correspondence information of the VM21, including: the IP address of the VM21, the MAC address of the VM21, and the network identifier MAC1 of the edge switch 1.

Then the address resolution server queries the address correspondence table according to the address correspondence information of the VM21; when the address correspondence table includes an existing address correspondence information (the IP address of the VM21, the MAC address of the VM21, and the network identifier MAC2 of the edge switch 2) in which the IP and MAC addresses are the same as the IP and MAC addresses of the VM21 but the device identifier is different from the device identifier from the VM21, the address resolution server uses the address correspondence information of the VM21 to update the existing address correspondence information.

Finally, the address resolution server sends the address correspondence information (the IP address of the VM21, the MAC address of the VM21, the network identifier MAC1 of the edge switch 1) of the VM21 to all edge switches in the layer-2 network by broadcasting, so that the other edge switches storing VM21 information update their own MAC entries as follows: write the correspondence between the MAC address of the VM21 and the network identifier MAC1 of the edge switch 1 into the MAC table.

When the first terminal requests communication with the destination terminal, the first terminal first sends an address request packet for obtaining the MAC address of the destination terminal.

Figure 4:
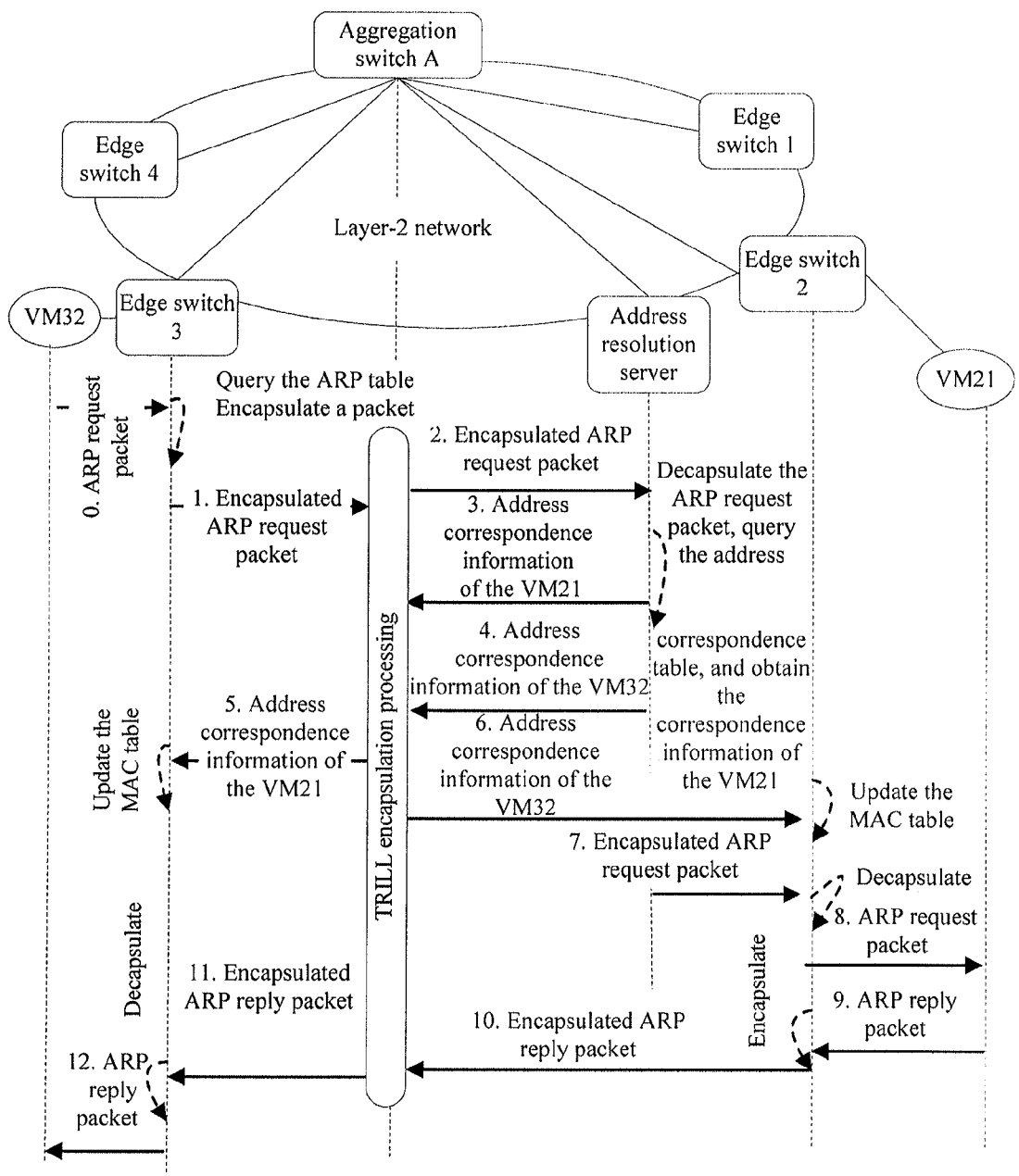
FIG. 4 is still another schematic diagram of information interaction for address resolution according to an embodiment.

For example, FIG. 4 is a schematic diagram of communication and information interaction between terminals for address resolution in IPv4 according to an embodiment.

As shown in FIG. 4, a VM32 requests communication with the VM21, and needs to obtain the MAC address of the VM21 according to the IP address of the VM21:

First, the VM 32 sends an ARP request packet, where the sender IP address and MAC address of the ARP request packet are the IP address and MAC address of the VM 32, the destination IP address is the IP address of the VM 21, and the destination MAC address is a broadcast address.

After receiving the ARP request packet, a edge switch 3 queries a local ARP table according to the destination IP address (the IP address of the VM 21); when there is no matched entry, the edge switch 3 adds a TRILL packet header to the outer layer of the ARP request packet to perform TRILL encapsulation on the ARP request packet, where the Ingress RBridge Nickname is the Nickname of the edge switch 3, and the Egress RBridge Nickname is the Nickname of the address resolution server, and then forwards the ARP request packet that has undergone the TRILL encapsulation to the address resolution server.

After receiving the ARP request packet that has undergone the TRILL encapsulation, the address resolution server performs decapsulation, and queries the address correspondence table according to the destination IP address (the IP address of the VM 21) in the ARP request packet.

When the destination IP address is the same as the IP address in an existing address correspondence information in the local address correspondence table, the address resolution server sends the existing address correspondence information (the IP address of the VM 21, the MAC address of the VM 21, and the Nickname of the edge switch 2) to the edge switch 3, so that the edge switch 3 updates its MAC table as follows: writes the correspondence between the MAC address of the VM 21 and the Nickname of the edge switch 2 into the MAC table; meanwhile, the address resolution server sends the MAC address of the VM 32 and the Nickname of the edge switch 3 to the network device corresponding to the device identifier in the existing address correspondence information, that is, the edge switch 2, so that the edge switch 2 updates its MAC table as follows: writes the correspondence between the MAC address of the VM 32 and the Nickname of the edge switch 3 into the MAC table.

Then the address resolution server adds a TRILL packet header to the outer layer of the ARP request packet to perform TRILL encapsulation for the ARP request packet, where the Ingress RBridge Nickname is the Nickname of the address resolution server, and the Ingress RBridge Nickname is the Nickname of the edge switch 2, and sends it to the edge switch 2.

After receiving the ARP request packet that has undergone the TRILL encapsulation, the edge switch 2 performs decapsulation and then forwards the packet to the VM 21. After receiving the ARP request packet, the VM 21 returns an ARP reply packet to the VM 32; the VM 32 establishes a connection with the VM 21 and performs subsequent communication.

With the technical solutions provided by the embodiments, ARP broadcast packets are uniformly processed by an address resolution server and are not broadcast in the network, so that the occupation of network bandwidth is reduced; the network device and terminal store address correspondence information of local and remote terminals being in communication, which may reduce the size of MAC tables in the data center network, reduce the load of the network device, and improve the processing capabilities of the network device, so that it is possible to deploy a very large scale network, namely, a large layer-2 network; meanwhile, the real-time relocation problem of a virtual machine can be solved.

Embodiment 2

Figure 5:
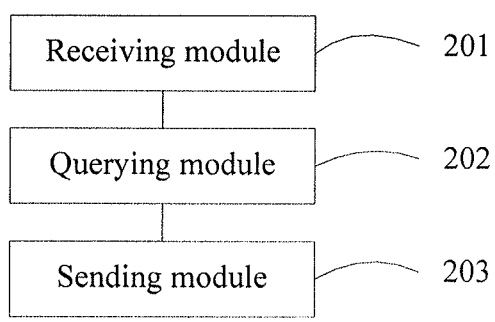
FIG. 5 is a block diagram of an address resolution apparatus according to an embodiment.

FIG. 5 is a block diagram of an address resolution apparatus according to an embodiment, where the apparatus includes a receiving module 201, a querying module 202, and a sending module 203.

The receiving module 201 is configured to receive an address request packet from a first terminal, where the address request packet includes a device identifier of a first network device.

The querying module 202 is configured to query an address correspondence table according to the destination IP address in the address request packet, where the address correspondence table includes address correspondence information, where the address correspondence information includes correspondence between an IP address of a terminal, a MAC address of the terminal, and a device identifier of a network device to which the terminal is connected.

The sending module 203 is configured to: when the destination IP address is the same as an IP address in an existing address correspondence information in the address correspondence table, send the existing address correspondence information to the first network device, so that the first network device updates its MAC table, and send a MAC address of the first terminal and the device identifier of the first network device to a network device corresponding to the device identifier in the existing address correspondence information, so that the network device corresponding to the device identifier in the existing address correspondence information updates its MAC table.

The address resolution apparatus may be implemented in a centralized way, or may also be implemented in a distributed and coordinated way. The address resolution apparatus is implemented by a processor or a hardware device.

In IPv4, the address request packet includes an ARP request packet, where the sender IP address is the IP address of the first terminal that sends the packet, the sender MAC address is the MAC address of the first terminal that sends the packet, the destination IP address is the IP address of the destination terminal, and the destination MAC address is a broadcast address; in IPv6, the address request packet includes a neighbor solicitation NS packet.

When the destination IP address is the same as the IP address in the existing address correspondence information in the address correspondence table, the sending module 203 is further configured to forward the address request packet to a terminal corresponding to the IP address and MAC address in the existing address correspondence information.

Before receiving the address request packet from the first terminal, the receiving module 201 is further configured to receive an address advertisement packet from the first terminal, where the address advertisement packet includes the device identifier of the first network device.

Correspondingly, the address resolution apparatus further includes:

an obtaining module 204, configured to obtain first address correspondence information according to the address advertisement packet, where the first address correspondence information includes correspondence between the IP address of the first terminal, the MAC address of the first terminal, and the device identifier of the first network device; and an updating module 205, configured to update the address correspondence table according to the first address correspondence information.

In IPv4, the address advertisement packet includes a free ARP packet, an ARP reply packet, or an RARP reply packet;

in IPv6, the address advertisement packet includes an unsolicited neighbor advertisement unsolicited NA packet.

The first network device may be an RB, an edge bridge, or an edge switch, and so on.

The device identifier may be a Nickname, an IS-IS identifier, a MAC address, or a device number, an so on.

The device identifier may also be carried in the payload of the address advertisement packet or the address request packet.

When the address request packet or the address advertisement packet is encapsulated through MAC-in-MAC or TRILL, the device identifier is carried in the encapsulation information of the address request packet or the address advertisement packet; correspondingly, the address resolution apparatus further includes:

a decapsulating module 206, configured to perform MAC-in-MAC or TRILL decapsulation on the address request packet or the address advertisement packet.

When the IP address in the first address correspondence information is different from an IP address in any address correspondence information in the address correspondence table, the updating module 205 adds the first address correspondence information to the address correspondence information table.

When the IP and MAC addresses in the first address correspondence information are the same as IP and MAC addresses in an existing address correspondence information in the address correspondence table, and the device identifier in the first address correspondence information is different from the device identifier in the existing address correspondence information, the updating module 205 uses the first address correspondence information to update the existing address correspondence information, and the sending module 203 sends the first address correspondence information to other network devices, so that the other network devices update their respective MAC tables.

The MAC table includes correspondence between a MAC address of a terminal and a device identifier of a network device to which the terminal is connected.

For example, in IPv4, a VM11 accesses the network from the edge switch 1 to perform online registration. First the VM11 sends a free ARP packet, where the sender IP address is an IP address of the VM11, the sender MAC address is a MAC address of the VM11, the destination IP address is the IP address of the VM11, and the destination MAC address is a broadcast address; after receiving the free ARP packet, the edge switch 1 updates the local ARP table and local MAC table, and then the edge switch 1 adds a TRILL packet header to the outer layer of the free ARP packet to perform TRILL encapsulation on the free ARP packet, where the Ingress RBridge Nickname is the Nickname of the edge switch 1, and the Egress RBridge Nickname is the Nickname of the address resolution server, and then forwards the free ARP packet that has undergone the TRILL encapsulation to the address resolution apparatus; the receiving module 201 receives the free ARP packet that has undergone the TRILL encapsulation, and after the packet is decapsulated by the decapsulating module 206, the obtaining module 204 obtains the address correspondence information of the VM11, including: the IP address of the VM11, the MAC address of the VM11, and the Nickname of the edge switch 1; the querying module 202 queries the address correspondence table according to the IP address in the address correspondence information of the VM11, and when the IP address of the VM11 is different from an IP address in any address correspondence information in the address correspondence table, the updating module 205 adds the address correspondence information of the VM11 to the address correspondence table.

When the first terminal requests communication with a destination terminal, the first terminal first sends an address request packet for obtaining the MAC address of the destination terminal.

For example, in IPv4, the virtual machine VM32 requests communication with the VM21 and the VM32 needs to obtain the address correspondence information of the VM21 according to the IP address of the VM21:

First, the VM32 sends an ARP request packet, where the sender IP address and MAC address of the ARP request packet are the IP address and MAC address of the VM32, the destination IP address is the IP address of the VM21, and the destination MAC address is a broadcast address.

After receiving the ARP request packet, the edge switch 3 queries the local ARP table according to the destination IP address (the IP address of the VM21); when there is no matched entry, the edge switch 3 adds a TRILL packet header to the outer layer of the ARP request packet to perform TRILL encapsulation on the ARP request packet, where the Ingress RBridge Nickname is the Nickname of the edge switch 3, and the Egress RBridge Nickname is the Nickname of the address resolution apparatus, and then forwards the ARP request packet that has undergone the TRILL encapsulation to the address resolution apparatus.

The receiving module 201 receives the ARP request packet that has undergone the TRILL encapsulation; after the packet is decapsulated by the decapsulating module 206, the querying module 202 queries the address correspondence table according to the destination IP address (the IP address of the VM21) of the ARP request packet; when the destination IP address is the same as an IP address in an existing address correspondence information in the local address correspondence table, the sending module 203 sends the existing address correspondence information (the IP address of the VM21, the MAC address of the VM21, and the Nickname of the edge switch 2) to the edge switch 3, so that the edge switch 3 updates its MAC table as follows: writes the correspondence between the MAC address of the VM21 and the Nickname of the edge switch 2 into the MAC table; meanwhile, the sending module 203 sends the MAC address of the VM32 and the Nickname of the edge switch 3 to the network device corresponding to the device identifier in the existing address correspondence information, namely, the edge switch 2, so that the edge switch 2 updates its MAC table as follows: writes the correspondence between the MAC address of the VM32 and the Nickname of the edge switch 3 into the MAC table.

Then the address resolution apparatus adds a TRILL packet header to the outer layer of the ARP request packet to perform TRILL encapsulation on the ARP request packet, where the Ingress RBridge Nickname is the Nickname of the address resolution server, and the Egress RBridge Nickname is the Nickname of the edge switch 2, and then the sending module 203 sends the request packet to the edge switch 2.

After receiving the ARP request packet that has undergone the TRILL encapsulation, the edge switch 2 performs decapsulation and then forwards the packet to the VM21. After receiving the ARP request packet, the VM21 returns an ARP reply packet to the VM32; the VM32 establishes a connection with the VM21 and performs subsequent communication.

With the technical solutions provided by the embodiments, ARP broadcast packets are uniformly processed by an address resolution apparatus and are not broadcast in the network, so that the occupation of network bandwidth is reduced; the network device and terminal store address correspondence information of local and remote terminals being in communication, which may reduce the size of MAC tables in the data center network, reduce the load of the network device, and improve the processing capabilities of the network device, so that it is possible to deploy a very large scale network, namely, a large layer-2 network; meanwhile, the real-time relocation problem of a virtual machine can be solved.

Embodiment 3

Figure 6:
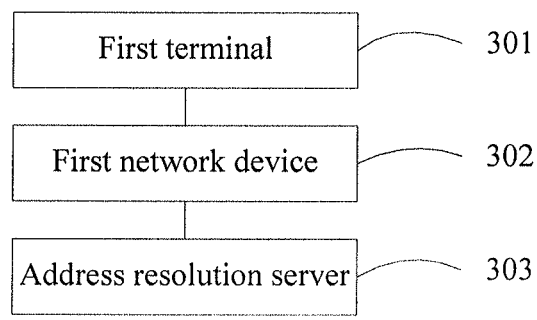
FIG. 6 is a schematic diagram of an address resolution system according to an embodiment.

FIG. 6 is a schematic diagram of an address resolution system according to an embodiment; the system includes a first terminal 301, a first network device 302, and an address resolution server 303.

The address resolution server 303 is configured to: receive an address request packet from the first terminal 301, where the address request packet includes a device identifier of the first network device 302; query an address correspondence table according to a destination IP address in the address request packet, where the address correspondence table includes address correspondence information, where the address correspondence information includes IP addresses of terminals, MAC addresses of the terminals, and device identifiers of network devices to which the terminals are connected; and when the destination IP address is the same as an IP address in an existing address correspondence information in the address correspondence table, send the existing address correspondence information to the first network device 302, so that the first network device 302 updates a MAC table, and send a MAC address of the first terminal 301 and the device identifier of the first network device 302 to a network device corresponding to the device identifier in the existing address correspondence information, so that the network device corresponding to the device identifier in the existing address correspondence information updates a MAC table.

The network-side MAC address learning function of the network device 302 is in the disabled state.

When the address advertisement packet or address request packet is encapsulated through MAC-in-MAC or TRILL, the device identifier is carried in the encapsulation information of the address advertisement packet or the address request packet; the device identifier may also be carried in the payload of the address advertisement packet or the address request packet.

The device identifier may be a Nickname, an IS-IS identifier, a MAC address, or a device number.

The MAC table includes correspondence between a MAC address of a terminal and a device identifier of a network device to which the terminal is connected.

The address resolution server 303 is further configured to: when the destination IP address in the address request packet is the same as the IP address in the existing address correspondence information in the address correspondence table, forward the address request packet to a terminal corresponding to the IP address and MAC address in the existing address correspondence information.

The address resolution server 303 is further configured to: receive an address advertisement packet from the first terminal, where the address advertisement packet includes the device identifier of the first network device; obtain first address correspondence information according to the address advertisement packet, where the first address correspondence information includes correspondence between the IP address of the first terminal, the MAC address of the first terminal, and the device identifier of the first network device; and update the address correspondence table according to the first address correspondence information.

With the technical solutions provided by the embodiments, the size of MAC tables in the data center network may be reduced; the load of the network device may be reduced, and the processing capabilities of the network device may be improved, and therefore reducing the delay of packets in the transmission process, so that it is possible to deploy a very large scale network, namely, a large layer-2 network; meanwhile, the real-time relocation problem of a VM can be solved.

It is understandable to a person of ordinary skill in the art that all or part of the steps in the methods provided in the preceding embodiments may be performed by hardware instructed by a program. The program may be stored in a computer readable storage medium, such as a ROM/RAM, a magnetic disk, and a CD-ROM.

The foregoing descriptions are merely exemplary specific embodiments, but are not intended to limit the protection scope of the claims. Variations or replacements by persons skilled in the art within the technical scope disclosed in the present invention shall fall within the protection scope of the claims.

What is claimed is:

1. An address resolution method, comprising:
receiving, by an address resolution server, an address request packet from a first terminal, wherein encapsulation information of the address request packet comprises an identifier of the address resolution server and a first device identifier of a first edge switch to which the first terminal is connected; and the address request packet comprises an Address Resolution Protocol (ARP) request packet in IPv4 or a neighbor solicitation (NS) packet in IPv6;
querying an address correspondence table in the address resolution server according to a destination IP address in the address request packet, wherein the address correspondence table comprises address correspondence information, wherein the address correspondence information comprises correspondence between an IP address of a terminal, a MAC address of the terminal, and a device identifier of a edge switch to which the terminal is connected; and
when the destination IP address is the same as an IP address in second existing address correspondence information in the address correspondence table:
sending, by the address resolution server, the second existing address correspondence information to the first edge switch, so that the first edge switch updates its MAC table according to the second existing address correspondence information;
sending, by the address resolution server, a first MAC address of the first terminal and the first device identifier of the first network edge switch to a second edge switch corresponding to a second device identifier in the second existing address correspondence information, so that the second edge switch updates its MAC table by using the first MAC address of the first terminal and the first device identifier of the first edge switch; and
sending, by the address resolution server, the address request packet to the second edge switch, to forward the address request packet to a second terminal corresponding to the IP address and MAC address in the second existing address correspondence information, so that the second terminal returns an address reply to the first terminal.

2. The method according to claim 1, wherein before receiving the address request packet from the first terminal, the method further comprises:
receiving an address advertisement packet from the first terminal, wherein encapsulation information of the address advertisement packet comprises the first device identifier of the first edge switch; the address advertisement packet comprises: any one of free ARP packet, ARP reply packet, and RARP reply packet in IPv4; or an unsolicited neighbor advertisement (NA) packet in IPv6;
obtaining first address correspondence information according to the address advertisement packet, wherein the first address correspondence information comprises correspondence between a first IP address of the first terminal, the first MAC address of the first terminal, and the first device identifier of the first edge switch; and
updating the address correspondence table according to the first address correspondence information.

3. The method according to claim 2, wherein updating the address correspondence table according to the first address correspondence information comprises:
when the first IP address of the first terminal is different from any IP address in the address correspondence table, adding the first address correspondence information to the address correspondence information table; and
when the first IP addresses of the first terminal is the same as an IP addresses in first existing address correspondence information in the address correspondence table and the first MAC addresses of the first terminal is the same as a MAC addresses in the first existing address correspondence information, and the first device identifier of the first edge switch is different from a device identifier in the first existing address correspondence information, using the first address correspondence information to update the first existing address correspondence information, and sending the first address correspondence information to a third edge switch, so that the third edge switch update its MAC table according to the first address correspondence information.

4. An address resolution system, comprising:
a first terminal;
a first edge switch; and
an address resolution server, wherein the first terminal connects to the first edge switch, the address resolution server is configured to:
receive an address request packet from the first terminal, wherein encapsulation information of the address request packet comprises an identifier of the address resolution server and a first device identifier of the first edge switch; and the address request packet comprises an Address Resolution Protocol (ARP) request packet in IPv4 or a neighbor solicitation (NS) packet in IPv6;
query an address correspondence table in the address resolution server according to a destination IP address in the address request packet, wherein the address correspondence table comprises address correspondence information, wherein the address correspondence information comprises IP addresses of terminals, MAC addresses of the terminals, and device identifiers of edge switches to which the terminals are connected; and when the destination IP address is the same as an IP address in second existing address correspondence information in the address correspondence table,
send the second existing address correspondence information to the first edge switch, so that the first edge switch updates its MAC table according to the second existing address correspondence information,
send a first MAC address of the first terminal and the first device identifier of the first edge switch to a second edge switch corresponding to a second device identifier in the second existing address correspondence information, so that the second edge switch updates its MAC table by using the first MAC address of the first terminal and the first device identifier of the first edge switch; and
send the address request packet to the second edge switch, to forward the address request packet to a second terminal corresponding to the IP address and MAC address in the second existing address correspondence information, so that the second terminal returns an address reply to the first terminal.

5. The system according to claim 4, wherein the address resolution server is further configured to:
receive an address advertisement packet from the first terminal, wherein according to the second existing address correspondence information the address advertisement packet comprises the first device identifier of the first edge switch; the address advertisement packet comprises: any one of free ARP packet, ARP reply packet, and RARP reply packet in IPv4; or an unsolicited neighbor advertisement (NA) packet in IPv6;
obtain first address correspondence information according to the address advertisement packet, wherein the first address correspondence information comprises correspondence between a first IP address of the first terminal, the first MAC address of the first terminal, and the first device identifier of the first edge switch; and
update the address correspondence table according to the first address correspondence information.

6. The system according to claim 5, wherein the address resolution server is specifically configured to:
when the first IP address of the first terminal is different from any IP address in the address correspondence table, add the first address correspondence information to the address correspondence information table; and
when the first IP addresses of the first terminal is the same as an IP addresses in first existing address correspondence information in the address correspondence table and the first MAC addresses of the first terminal is the same as a MAC addresses in the first existing address correspondence information, and the first device identifier of the first edge switch is different from a device identifier in the first existing address correspondence information, use the first address correspondence information to update the first existing address correspondence information, and send the first address correspondence information to a third edge switch, so that the third edge switch updates its MAC table according to the first address correspondence information.

7. An address resolution server, comprising a processor executing program stored on a computer-readable storage medium to perform:
receiving an address request packet from a first terminal, wherein encapsulation information of the address request packet comprises an identifier of the address resolution server and a first device identifier of a first edge switch to which the first terminal is connected; and the address request packet comprises an Address Resolution Protocol (ARP) request packet in IPv4 or a neighbor solicitation (NS) packet in IPv6;

querying an address correspondence table in the address resolution server according to a destination IP address in the address request packet, wherein the address correspondence table comprises address correspondence information, wherein the address correspondence information comprises correspondence between an IP address of a terminal, a MAC address of the terminal, and a device identifier of a edge switch to which the terminal is connected; and when the destination IP address is the same as an IP address in second existing address correspondence information in the address correspondence table:

sending the second existing address correspondence information to the first edge switch, so that the first edge switch updates its MAC table according to the second existing address correspondence information;

sending a first MAC address of the first terminal and the first device identifier of the first edge switch to a second edge switch corresponding to a second device identifier in the second existing address correspondence information, so that the second edge switch updates its MAC table by using the first MAC address of the first terminal and the first device identifier of the first edge switch; and sending the address request packet to the second edge switch, to forward the address request packet to a second terminal corresponding to the IP address and MAC address in the second existing address correspondence information, so that the second terminal returns an address reply to the first terminal.

8. The address resolution server according to claim 7, wherein before receiving the address request packet from the first terminal, the processor further performs:

receiving an address advertisement packet from the first terminal, wherein encapsulation information of the address advertisement packet comprises the first device identifier of the first edge switch; the address advertisement packet comprises: any one of free ARP packet, ARP reply packet, and RARP reply packet in IPv4; or an unsolicited neighbor advertisement (NA) packet in IPv6;

obtaining first address correspondence information according to the address advertisement packet, wherein the first address correspondence information comprises correspondence between a first IP address of the first terminal, the first MAC address of the first terminal, and the first device identifier of the first edge switch; and updating the address correspondence table according to the first address correspondence information.

9. The address resolution server according to claim 8, wherein updating the address correspondence table according to the first address correspondence information comprises:

when the first IP address of the first terminal is different from any IP address in the address correspondence table, adding the first address correspondence information to the address correspondence information table; and when the first IP addresses of the first terminal is the same as an IP addresses in first existing address correspondence information in the address correspondence table and the first MAC addresses of the first terminal is the same as a MAC addresses in the first existing address correspondence information, and the first device identifier of the first edge switch is different from a device identifier in the first existing address correspondence information, using the first address correspondence information to update the first existing address correspondence information, and sending the first address correspondence information to a third edge switch, so that the third edge switch updates its MAC table according to the first address correspondence information.

* * * * *